United States Patent Office 3,310,175
Patented Mar. 21, 1967

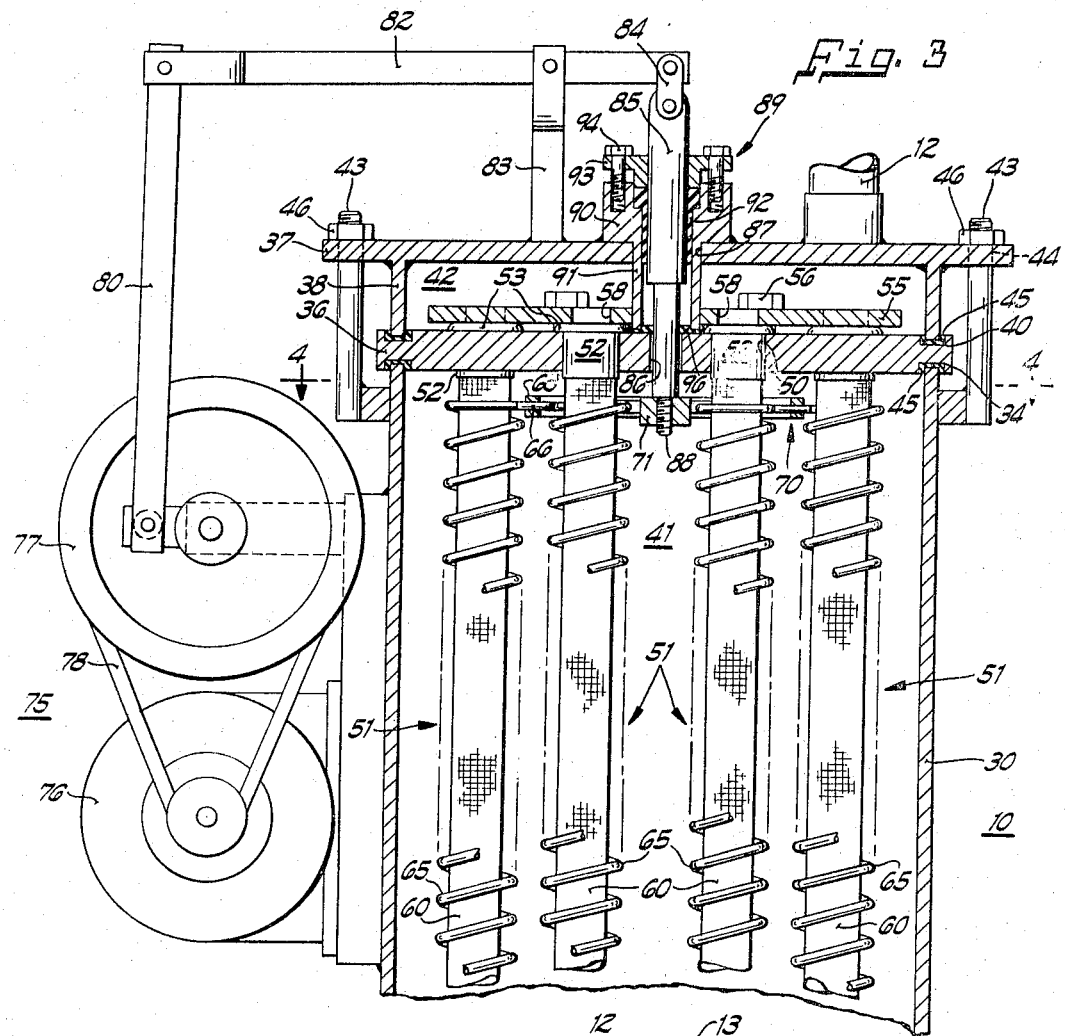

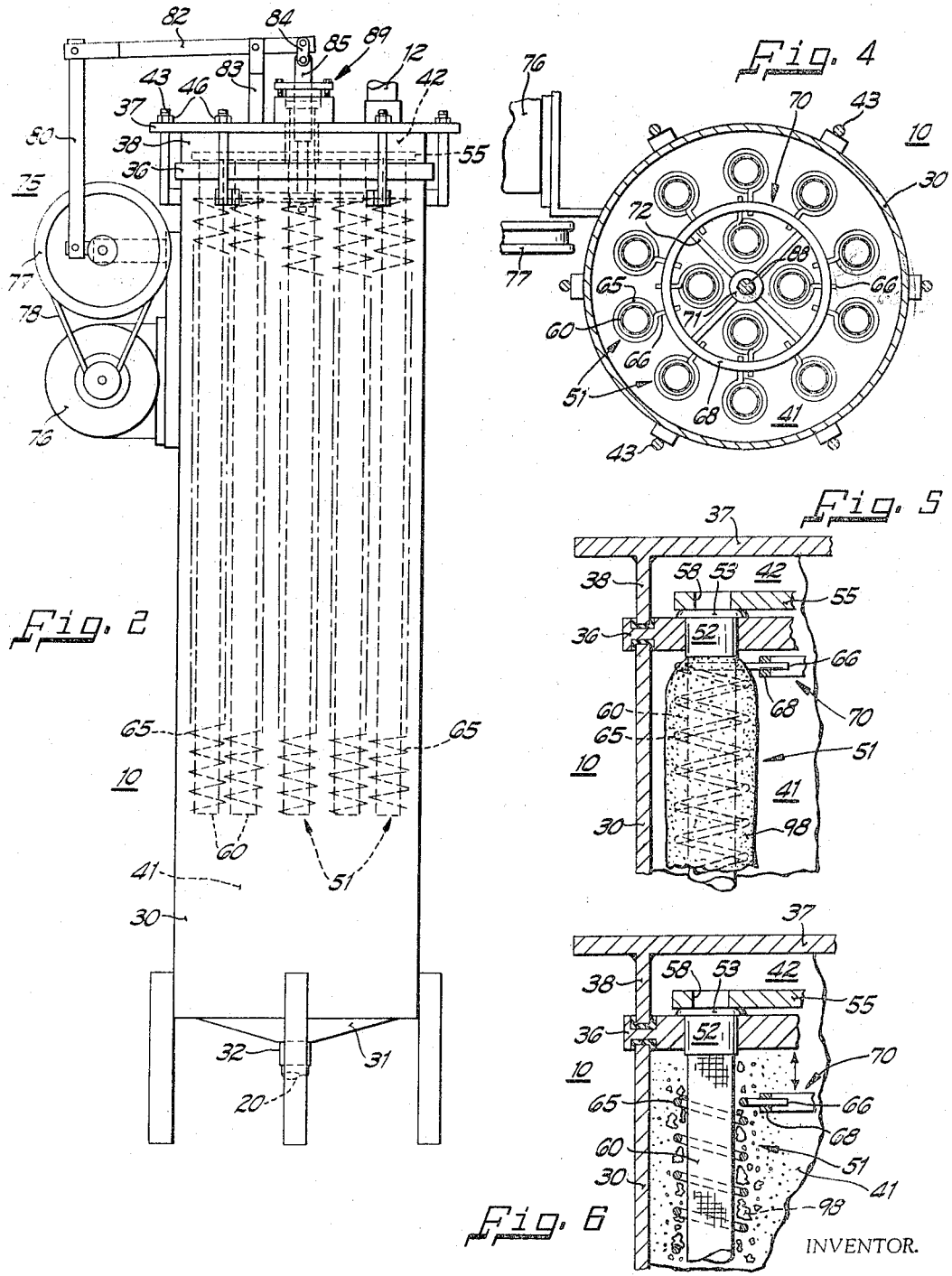

3,310,175
FILTER
Russell G. McLagan, Milford, Ohio, assignor to McGraw-Edison Company, Milwaukee, Wis., a corporation of Delaware
Continuation of application Ser. No. 325,408, Nov. 21, 1963. This application Apr. 22, 1966, Ser. No. 544,628
6 Claims. (Cl. 210—193)

This application is a continuation of application Ser. No. 325,408, filed Nov. 21, 1963, and now abandoned.

This invention relates to filters and more particularly to means for removing filter aid medium from the filter elements of up-flow tubular type filters.

Filters of the up-flow tubular type, which may be used to filter dry cleaning solvent, for example, generally include an outer housing which encloses a plurality of elongate pervious tubular filtering elements. In addition, a filter aid powder, such as diatomaceous earth, is ordinarily added to the solvent and externally pre-coats the tubes with a filter aid cake which is coarse in character and forms the actual filtering medium.

As the solvent is passed through the filter, the filter aid cake removes entrained dirt, lint and the like as well as gummy, oily substances which tend to penetrate into the cake in addition to forming a surface coating. As a result, the filter aid cake adheres to the filter elements and is not easy to disloged when replacement is needed. One prior art method for removing the filter aid cake consisted of introducing clean solvent into the interior of the tubes under pump pressure to break the cake away from the exterior of the tube. However, this method was not uniformly successful in completely removing the filter medium. Other prior art methods included physically jarring the filter elements or oscillating them in the solvent so that the filtering medium or deposited sludge is broken away or removed by the agitated solvent. The latter methods, however, are appropriate only for filter elements having particular physical characteristics and are not suitable for up-flow tubular filters of the type having fixedly mounted filter elements. It is an object of the invention to provide a new and improved means for physically removing the filter aid cake from the filter elements of an upflow tubular type filter.

Another object of the invention is to provide means for removing the filtering medium from the filter elements of an up-flow type filter wherein the filtering medium is broken into sufficiently small particles to allow its direct reapplication or removal by pumping or draining it from the filter along with the solvent.

Yet another object of the invention is to provide a resilient movable member for removing filter aid medium from the elements of an up-flow tubular filter wherein the conventional fixedly mounted tubular elements may be employed.

A more specific object of the invention is to provide a resilient pervious member in concentric surrounding relation to the tubular filter elements of an up-flow type filter and means for moving said member longitudinally of the filter elements so that the filter aid medium disposed thereon will be removed. According to a more specific object of the invention, the filter aid removing member consists of a relatively stiff helically wound spring having widely spaced convolutions.

These and other objects and advantages of the instant invention will become more apparent from the detailed description thereof taken with the accompanying drawings in which:

FIG. 1 schematically illustrates dry cleaning apparatus of the type with which the instant invention is useable;

FIG. 2 is a side elevational view of the filter employed with the dry cleaning apparatus of FIG. 1 and which incorporates the instant invention;

FIG. 3 is a fragmentary view, partly in section, of the filter shown in FIG. 2;

FIG. 4 is a view taken along lines 4—4 of FIG. 3; and

FIGS. 5 and 6 illustrate the operation of the filter aid cake removing means according to the instant invention.

Referring to the drawings in greater detail, FIG. 1 schematically illustrates a typical dry cleaning apparatus having a filter 10 and a washer 11 of any well-known type which employs dry cleaning solvent. A conduit 12 connects the upper end of the filter 10 to the input of the washer 11 through a shutoff valve 13 while the output of washer 11 is connected to a fluid reservoir tank 14 by a conduit 16. A bypass conduit 17 having a shutoff valve 18 connects to the upper end of filter 10 to the reservoir tank 14.

The input of a suitable pump 15 is connected to the reservoir tank 14 by a conduit 19 and its output is connected by a conduit 20 having a check valve 21 and a shutoff valve 22 to the lower or input end of the filter 10. A conduit 23 having a valve 24 also connects the lower end of filter 10 to the input of a pump 25 whose output is connected by a conduit 26 to a sludge stripper 28. A return conduit 29 also connects the sludge stripper 28 to the reservoir tank 14.

When operation of the dry cleaning appartus illustrated in FIG. 1 is to commence, valves 18 and 22 are opened, valves 13 and 24 are closed and pumps 15 and 25 are off. The required quantity of filter aid is added to the solvent in the reservoir tank 14 and the pump 15 is then actuated so that the solvent with the entrained filter aid passes through the conduit 20 into the lower end of the filter 10 where the filter aid is deposited on the filter elements disposed therein in a manner which will become more readily apparent from the detailed description of the filter 10 hereinbelow. The clear solvent then circuates back to the tank 14 through valve 18 and conduit 17. When the tubes in filter 10 have been coated, by-pass valve 18 is closed and valve 13 is opened so that solvent is admitted to the washer 11. The solvent thereafter circulates from the reservoir tank 14 through the filter 10 and the washer 11 for the time required to perform the cleaning operation.

Referring now to FIGS. 2 and 3, the filter 10 is shown to include an elongate metallic tank 30 of any suitable configuration such as a cylinder and having a suitably sealed bottom closure 31 provided with an inlet 32 for connection to the conduit 20.

The upper edge of the tank 30 is engaged by an annular recess 34 formed in the lower surface of a flat, circular partition or tube support plate 36. A circular cover 37 is provided above the tube support plate 36 and has a cylindrical section 38 suitably affixed in a sealing relation to its lower surface. The section 38 is concentric and co-radial with the tank 30 and its lower edge engages an annular recess 40 formed in the upper surface of the tube support plate 36. The tube plate 36 divides the filter into a large main chamber 41 defined by the tank 30 and a smaller outlet chamber 42 defined by the cover 37.

The cover 37 and the tube plate 36 are held in position by a plurality of peripherally spaced studs 43 secured to the upper end of the tank 30 and extending upwardly through aligned apertures 44 formed adjacent the outer periphery of the cover 37 and engaged at their threaded upper ends by nuts 46. Gaskets 45 are disposed in each of the recesses 34 and 40 in the lower and upper surfaces of the tube plate 36, respectively, to seal its junctions with the tank 30 and the tubular section 38.

The tube support plate 36 is provided with a plurality of spaced apertures 50, each of which receives a pendant type filter member 51. Each of the filter members 51 has an upper sleeve 52 disposed in its respective apertures 50 and provided with a flange 53 at its upper end which is firmly seated against the upper surface of the tube support plate 36 by a hold-down plate 55 suitably held in position by bolts 56. Hold-down plate 55 has a plurality of apertures 58, each of which is in registry with one of the apertures 50 in the tube support plate 36 to permit the passage of solvent from the main chamber 41 to the upper chamber 42. The filter members 51 also include filter elements 60, each consisting of a tube of pervious material, such as wire screening, which is affixed at its upper end to its respective sleeve 52 and whose lower end is closed.

A relatively stiff, helically wound, uniformly advancing coil spring 65, having relatively widely spaced convolutions, is disposed circumjacent each of the filter elements 60 and is substantially coextensive therewith. The upper end of each of the springs 65 is bent laterally outward to form a lug 66 which extends through suitably positioned apertures in the rim portion 68 of a wheel member 70 having a central hub 71 and spokes 72 radiating from the hub 71 to the rim portion 68. The wheel member 68 couples each of the springs 65 to a drive assembly 75 so that the springs may be agitated for the purpose of dislodging filter aid material from the elements 60 in a manner which will be described more fully hereinbelow.

The drive assembly 75 includes a motor 76 and a relatively large sheave 77 which are interconnected by a belt 78 and each of which is suitably mounted adjacent the upper end of the tank 30. The lower end of a rod 80 is eccentrically connected to the sheave 77 while its upper end is pivotally connected to one end of a lever 82 which is pivotally connected intermediate its ends to a fulcrum bracket 83 fixedly mounted on the upper surface of the cover 37. The opposite end of the lever 82 is connected through a short link 84 to the upper end of a shaft 85 extending downwardly through central apertures 86 and 87 in the tube plate 36 and the cover 37, respectively, where its lower end 88 threadably engages the hub 71.

In order to seal the passage of shaft 85 through the central aperture 87 in the cover 37 a suitable packing assembly 89 is provided and includes a body portion 90 affixed to the upper surface of cover 37 in surrounding relation to the aperture 87 and a tubular extension 91 which extends downwardly through said aperture. A sealing bushing 92 is disposed within the body portion 90 and is held in position by a packing retainer 93 adjustably fastened to the member 90 by bolts 94. The lower edge of the tubular extension 91 rests against a gasket 96 to fix the latter about aperture 86 in tube plate 36 to thereby prevent the leakage of unfiltered solvent from the main chamber 41 to the outlet chamber 42.

At the commencement of a cleaning operation each of the springs 65 is embedded in the filter aid cake 98 disposed on each of the filter elements 60 as seen in FIG. 5. After the filter aid cake 98 has become permeated with filtered substances and its removal is required, valve 18 (see FIG. 1) is opened, valve 13 is closed and pump 15 is then shut off to relieve liquid pressure in the filter 10. The motor 76 is then energized to rotate the sheave 77 and thereby pivot the lever 82 about fulcrum 83 to impart rapid oscillatory motion to the shaft 85. Because each of the springs is embedded in the filter aid cake 98 movement along their entire lengths is initially prevented. However, the rapid oscillatory motion imparted to the wheel member 70 causes the filter aid cake 98 to begin breaking away at the uppermost end of the filter elements 60 while the remainder of the springs 65 remain stationary. As the filter aid cake 98 begins to break away at the upper ends of the elements 60, the first few convolutions at the upper end of the spring are freed for movement, causing further filter aid material to begin crumbling. As seen in FIG. 6, this action progresses downwardly until the entire spring is in rapid oscillatory motion which not only crumbles those portions of the filter aid cake in contact with the spring convolutions but also removes the filter aid material along the entire length of the filter element 60.

It will be appreciated that the filter aid removing means according to the instant invention not only effectively removes the filter aid cake 98 from the filter element 60 but also tends to break the filter aid material into relatively small particles. This is desirable not only to facilitate the removal of the filter aid material from the filter 10 but also where the filter aid material is to be immediately reapplied to the filter elements 60. It has been found that the filter aid material, when mixed with the filtered material and dirt, is more porous than when the dirt remains in a coating on the surface of the filter aid cake. This mixing is facilitated by the crumbling action of the spring as it removes the filter aid material from the filter 60 whereby the dirt and filter aid material become dispersed through the solvent and can then be reapplied to the filter element to provide a more porous filtering medium. This is accomplished by restarting the pump 15 with the valve 18 open and the valve 13 closed so that circulation is renewed through the by-pass circuit to recoat the filter elements 60.

When the accumulated dirt and filtered material become excessive so that the flow rate is inordinately reduced, the filter aid material must be removed from the filter 10 after it is dislodged from the filter elements 60. With reference to FIG. 1, removal of the filter aid material and sludge from the filter 10 is accomplished by opening valve 24 and closing valve 22 with pump 25 operating and pump 15 off. This removes the solvent, the filter aid particles and the sludge from the lower end of the tank 30 through conduits 23 and 26 to the sludge stripper 28 which removes these particles and returns the remaining solvent to the reservoir tank 14 through conduit 29. It will also be understood by those skilled in the art that the filter aid and solvent may also be removed from the tank 30 by gravity draining.

It will be understood that while lever 82 is shown to be motor operated it can also be operated by any other means, including manually. It will also be understood that the various pumps and valves may be operated either manually or automatically.

While only a single embodiment of the invention has been shown and described, it is not intended to be limited thereby but only by the scope of the appended claims.

I claim:

1. In an upflow filtering system, the combination of a hollow casing having an inlet adjacent its lower end and an outlet adjacent its upper end and means for introducing fluid and filter aid medium into said inlet and for removing fluid from said outlet, fixed partition means dividing said casing into upper and lower chambers, a plurality of apertures formed in said partition means, a plurality of pervious elongate tubular filter elements, each of said elements being attached at one end to said partition means in surrounding relation to one of said apertures and extending into said lower chamber, said filter aid medium being deposited on each of said elements, a coil spring disposed in concentric surrounding relation to each of said filter elements and disposed beneath said filter aid medium, said springs having widely spaced convolutions, coupling means connected to one end of each of said springs, and selectively operable drive means engaging said coupling means for simultaneously moving said springs longitudinally of their respective filter elements.

2. The filtering device set forth in claim 1 wherein said springs are entirely free for rapid oscillatory motion relative to their associated one of said filter elements.

3. The filtering device set forth in claim 2 wherein said springs are relatively stiff and are substantially coextensive with said filter elements.

4. The filtering device set forth in claim 3 wherein said coupling means extends in a sealed relation through said partition means and the upper end of said casing, and wherein said drive means comprises selectively operable electromotive drive means connected to said coupling means for imparting rapid oscillatory motion thereto.

5. The filtering system set forth in claim 4 wherein said coupling means comprises an enlarged member disposed below said partition means wherein the oscillations thereof prevents the accumulation of particles on the lower surface of said partition means.

6. The filtering system set forth in claim 4 wherein said elements comprise tubular members formed of wire mesh.

References Cited by the Examiner

UNITED STATES PATENTS

| 786,549 | 4/1905 | Dion | 210—413 |
|---|---|---|---|
| 2,653,444 | 9/1953 | Oishei | 55—296 X |
| 3,034,652 | 5/1962 | Hobson | 210—323 X |
| 3,100,190 | 8/1963 | Hobson | 210—332 X |

FOREIGN PATENTS

| 1,068,252 | 2/1954 | France. |
|---|---|---|
| 864,583 | 4/1961 | Great Britain. |

REUBEN FRIEDMAN, *Primary Examiner.*

J. DECESARE, *Assistant Examiner.*